(12) United States Patent
Vakil et al.

(10) Patent No.: US 7,072,317 B2
(45) Date of Patent: Jul. 4, 2006

(54) METHOD AND APPARATUS FOR PROVIDING SOFT HAND-OFF IN IP-CENTRIC WIRELESS CDMA NETWORKS

(75) Inventors: Faramak Vakil, Bedminster, NJ (US); David Famolari, Montclair, NJ (US); Shinichi Baba, Morristown, NJ (US); Tadahiko Maeda, Summit, NJ (US)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 936 days.

(21) Appl. No.: 10/103,919

(22) Filed: Mar. 22, 2002

(65) Prior Publication Data

US 2002/0167921 A1 Nov. 14, 2002

Related U.S. Application Data

(60) Provisional application No. 60/278,014, filed on Mar. 22, 2001.

(51) Int. Cl.
*H04Q 7/00* (2006.01)

(52) U.S. Cl. ..................... 370/332; 370/338
(58) Field of Classification Search ............... 370/332, 370/338
See application file for complete search history.

(56) References Cited

U.S. PATENT DOCUMENTS

| | | | | |
|---|---|---|---|---|
| 4,596,024 A * | 6/1986 | Thomson | ..................... | 375/347 |
| 6,137,784 A * | 10/2000 | Wallerius et al. | ........... | 370/328 |
| 6,212,387 B1 * | 4/2001 | McLaughlin et al. | ....... | 455/450 |
| 6,222,830 B1 * | 4/2001 | Padovani et al. | ........... | 370/332 |
| 6,259,683 B1 * | 7/2001 | Sekine et al. | ............... | 370/328 |
| 6,349,094 B1 * | 2/2002 | Vastano et al. | ............. | 370/328 |
| 6,504,837 B1 * | 1/2003 | Menzel | ....................... | 370/351 |
| 6,591,382 B1 * | 7/2003 | Molloy et al. | .............. | 714/704 |

OTHER PUBLICATIONS

J. Escobar, et al., "Flow Synchronization Protocol," IEEE/ACM Trans, on Networking, vol. 2, No. 2, Apr. 1994.

* cited by examiner

*Primary Examiner*—Hassan Kizou
*Assistant Examiner*—Anthony Sol
(74) *Attorney, Agent, or Firm*—Joseph Giordano; James W. Falk

(57) ABSTRACT

A Virtual Soft-Hand-off method for wireless IP-centric CDMA networks whose routers, hosts, and mobile stations have small group multicast (SGM) capability comprises setting up an explicit synchronous multicast session among a small group of participants with dynamic group membership. Packets transmitted over the multicast session are time stamped to help maintain synchronization, and the receivers recover multiple packet flows from the multiple received signals concurrently and combine them to create a single packet flow at higher layers.

4 Claims, 3 Drawing Sheets

METHOD AND APPARATUS FOR PROVIDING SOFT HAND-OFF IN IP-CENTRIC WIRELESS CDMA NETWORKS

CROSS-REFERENCE TO RELATED APPLICATION

This application is a non-provisional application of provisional application Ser. No. 60/278,014 filed Mar. 22, 2001.

FIELD OF THE INVENTION

The present invention relates generally to the use of CDMA for the design of IP-Centric wireless networks. Specifically, our invention is a method and apparatus for providing a virtual soft-hand-off technique in an end-to-end Internet Protocol (IP) wireless communications system, which uses code division multiple access (CDMA) transmission technology at the physical layer.

BACKGROUND OF THE INVENTION

Today, many different wireless systems exist, ranging from indoor wireless LANs (Local Area Networks) to outdoor cellular systems. Generally, the numerous wireless systems are not compatible with each other, making it difficult to roam from one system to another. Although there have been attempts to unify third-generation wireless systems, incompatible systems are expected to co-exist in the future. Furthermore, wireless LANs and cellular wireless systems are being developed independently, and such systems are also evolving independently. So far, no wireless technology has emerged as a common and long-term universal solution.

IP (Internet Protocol), which is already a universal network-layer protocol for packet networks, is rapidly becoming a promising universal network-layer protocol for wireless systems. An IP terminal, with multiple radio interfaces, can roam between different wireless systems if they all support IP as a common network layer. Unlike today's wireless systems in which Radio Access Networks (RANs) are mostly proprietary, IP provides an open interface and promotes an open market. IP will also enable widely adopted and rapidly growing IP-based applications to run over wireless networks. Moreover, distributed, autonomous IP-based wireless base stations have the potential of making the wireless systems more robust, scalable, and cost effective. There is, as a result, a current trend towards the design of Internet Protocol (IP) centric wireless networks comprising a large number of cells each covered by an autonomous IP router base station.

There are, however, many challenges to realizing distributed all-IP wireless networks. For the sake of specificity in discussing these challenges as well as pointing out problem areas, reference is made to FIG. 1. The depiction of network 100 in FIG. 1 illustrates an exemplary configuration of a network that uses IP-based wireless base stations (designated BSs). The coverage area of the wireless network is defined by a multiplicity of cells (e.g., cells 101, 102, 103). The geographical area covered by each wireless base station is referred to as a cell (e.g., BS 111 serves cell 101, and so forth). When mobile station 104 moves from one cell (e.g., cell 101 originally) into the overlapping regions (e.g., overlap of cells 101 and 102) of the coverage areas of multiple base stations, base station 111 may perform a "hand-off" of mobile station 104 to base station 112. Hand-off is a process whereby a mobile station communicating with one wireless base station is switched to another base station during a session. Overlap regions 117 and 118 are coverage areas where hand-off is effected. For example, as mobile station 104 moves into region 117 while roaming in cell 101, the radio signal strength from BS 2 (depicted by reference numeral 115) may be greater than the radio signal strength (114) from BS 1, so hand-off is warranted to maintain the quality of the established session.

Among the key challenges in a distributed all-IP wireless network is how to support "soft hand-off". As suggested above, hand-off is the process that allows a mobile station's session-in-progress to continue without interruption when a mobile station (MS) moves from one wireless cell to another. Soft hand-off is a form of hand-off whereby a mobile station can start communication with the target base stations without interrupting the communication with the serving base station. Thus, soft hand-off allows a MS to communicate with multiple base stations (BSs) simultaneously. In particular, soft hand-off has been shown to be an effective way for increasing the capacity, reliability, and coverage range of CDMA-based wireless networks. Soft hand-off also provides more time for carrying out the hand-off procedure.

Soft hand-off in a CDMA-based wireless system is the focus of the subject matter of the present invention. In Code Division Multiple Access (CDMA) radio systems, a narrowband user message signal is multiplied by a very large bandwidth signal called the spreading signal. The spreading signal is a pseudo-noise code sequence that has a communication signal rate, which is an order of magnitude greater than the data rate of the user message signal. All users in a CDMA system may transmit simultaneously. Each user has its own pseudorandom code for coding its own message signal—each code is approximately orthogonal to all other codes. A receiver is assigned a code to detect a desired user message signal, and performs a time correlation operation to detect only the specific assigned code. All other codes appear as noise due to de-correlation. CDMA is effective in wireless systems because a receiver can be assigned a multiplicity of codes to detect message signals from a corresponding multiplicity of transmitters, thereby engendering the soft hand-off process.

An IP router is an IP network device that runs IP layer routing protocol (e.g., OSPF and BGP) and forwards IP packets. The running of a routing protocol decides the "routing policy", and the forwarding of IP packets realizes the "routing mechanism". IP packets arriving from the wireline IP network (121) at a given base station (e.g., BS 111 over wireline path 122 or BS 112 over path 123) can be routed by the routing mechanism of the base station to mobile station 104 (or other appropriate wireline devices that connect directly to the base station).

The fact that mobile stations (MSs) in different cells belong to different IP subnets suggests that a CDMA MS has multiple IP addresses as well as changes at least one of these IP address every time it moves into a new cell. Apart from additional delay due to getting and changing of IP addresses, as well as possible modification of the end-to-end session between an MS and its corresponding host, having multiple IP addresses per MS makes soft hand-off more difficult to implement because an MS receives multiple IP packet streams from different BSs with different traffic loads. The contents of these IP packet streams coming to the MS from different BSs will not be synchronized because copies of the same packet on each of these streams either experience different delays at different BSs, or may be lost altogether before reaching the MS. Consequently, copies of the same packets from different base stations may not be correctly combined by the MS's radio system. As a matter of fact, in this case, it is also possible that the MS's radio system combines copies of different packets received from different BSs.

From another viewpoint, in today's circuit-switched CDMA networks such as IS-95, a centralized Base Station Controller (BSC) is responsible for data distribution in the forward direction (from BS to MS). The BSC creates and distributes multiple streams of the same data over layer-2 circuits to multiple BSs that in turn relay the data to the MS. The MS's radio system (typically working below the IP layer) collaborates with the BSs to synchronize the radio channel frames and combine the radio signals received from different BSs to generate a single final copy of received data. The BSC helps ensure data content synchronization by ensuring that the matching layer-2 frames sent to different base stations contain copies of the same data. In the reverse direction (from MS to BS), the MS ensures that the matching layer-2 frames sent to different BSs contain copies of the same data. The BSC then selects one of the frames received from different base stations as the final copy of the data.

One problem already alluded to is loss of data content synchronization. With distributed BSs, centralized control entities, such as the BSC in circuit switched wireless networks, will no longer exist. Consequently, even though the CDMA radio system is capable of synchronizing the link and physical layer frames on the radio channel, it cannot, on its own, guarantee that the matching frames from different base stations will carry copies of the same data. For example, IP packets can be lost on their way to the MS, creating random gaps in the packet streams received by the MS from different BSs. Furthermore, copies of the same data may arrive at the MS at different times due to the random delays suffered by the packets. Random gaps and delays can lead to a loss of data content synchronization. Suppose that packet X is lost at BS 1 (due to, for example, buffer overflow) but is not lost at BS 2. Then, another totally unrelated packet Y from BS 1 and packet X from BS 2 may arrive at the MS at the same time and the MS's radio system will not be able to tell that they are not copies of the same data and will hence erroneously combine X with Y.

The art is devoid of a methodology and concomitant systems that effect soft hand-off in an all-IP wireless network that uses autonomous BSs in a configuration having the following characteristics that differentiate the configuration from existing wireless networks: (a) the BSs use IP protocols for both signaling and transport of user traffic. For example, they may route/forward IP packets based on information carried in the IP headers, perform IP-layer signaling, mobility management and Quality of Service (QoS) management functions; (b) the BSs function autonomously. There is no centralized signaling and control over the behaviors of the BSs; (c) the BSs are interconnected via an IP network, which could have arbitrary network topology such as bus, ring, star, tree, etc.; and (d) the cells (a cell is a geographical radio coverage area of a BS) can be arranged in any arbitrary configuration.

In order to support soft hand-off and satisfy its stringent synchronization requirements, current CDMA RANs usually take the following measures. A CDMA RAN provides means of stringent synchronization among its elements. The BSC manages the transmission power of MSs and BSs to ensure low error rate as well as minimize the power consumption. Moreover, as the MS moves, the BSC interacts with it to select and maintain an "optimum" set of BSs with which the MS remains in contact. On the forward link the BSC receives packets destined for the MS segments and assembles them into radio frames, and replicates the radio frames and transmits copies to BSs that are currently in contact with the MS. On the reverse link, the BSC collects copies of the radio frames received from BSs that are currently in contact with the MS, selects one of them, and synthesizes IP packets for forwarding to the wireline backbone.

Today's CDMA networks use BSCs as the focal anchoring points for frame distribution and selection as well as content synchronization during soft hand-off. However, IP-centric networks do not employ a BSC and as such there is no focal anchoring point for control of soft hand-offs. However, without a BSC process to control the transmissions from the Base Stations, the soft hand-off process in a IP-centric CDMA environment suffer from: (i) the lack of a means for efficient distribution of packet flows to multiple BSs, (ii) loss of content synchronization because the multiple packet flows destined for the MS experience different loss and delay across the network, (iii) inaccuracy of signal combination at the radio (i.e. physical) layer caused by the combination of radio signals at the physical layer of the MS resulting in erroneous synthesis of packets at higher layers because contents of their packet flows within received signals are not synchronized, and (iv) the need to have the MS select and maintain their active set of BSs.

Thus there is a need in the art for a soft hand-off process to be used in IP centric CDMA networks that overcome the limitations of the prior art as set forth above.

SUMMARY OF THE INVENTION

These shortcomings and other limitations and deficiencies are obviated in accordance with the present invention for a wireless IP-centric CDMA networks whose routers, hosts and mobile stations have: small group multicast (SGM) capability, the ability to time stamp all packets transmitted, and the ability to mix multiple flows at a higher layer than the physical layer in the protocol stack.

DETAILED DESCRIPTION OF PREFERRED EMBODIMENTS

Figure 1:
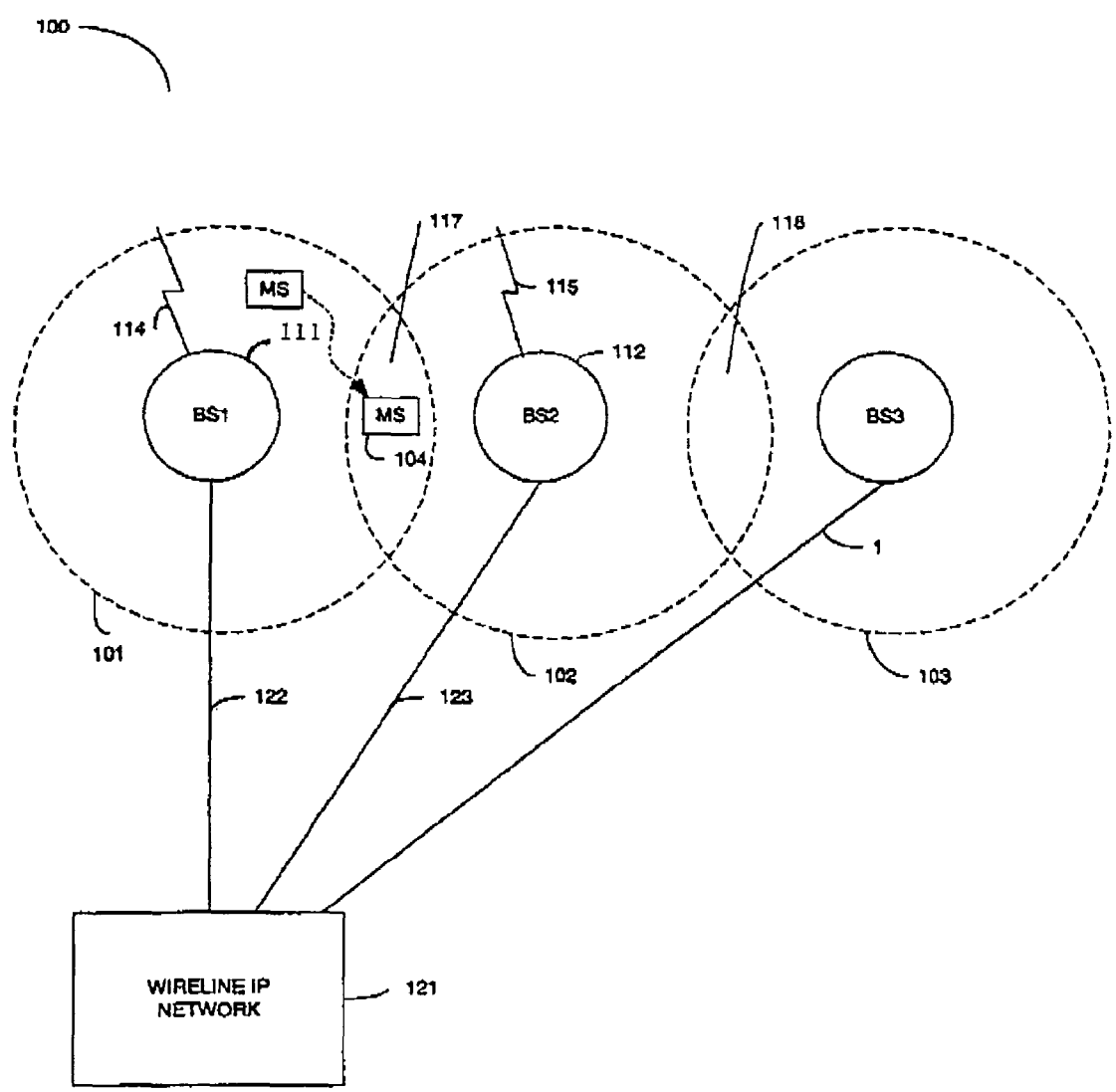
FIG. 1 illustrates the architecture of an IP centric CDMA wireless network.

Our invention is a virtual soft hand-off method and transceiver that resolves aforementioned issues in IP-centric CDMA environments. The virtual soft hand-off is built upon two simple ideas and a basic requirement. Let us start with the ideas and then explain the requirement. First, each Mobile station receives and maintains a separate IP address for each cell (i.e. BS) with which it is active and the MS sets up an explicit synchronous multicast session among each of its addresses and the device (another MS or host) to which it would connect. Second, unlike current art soft hand-off schemes, it recovers multiple packet flows from the multiple received signals concurrently, and combines them at a higher layer in the protocol stack to create a single packet flow. The basic requirement for the realization of virtual soft hand-off is that each element in the network (e.g. routers, hosts, and MSs) must be small group multicasting (SGM) capable. SGM is a known process used for small group multicasting (e.g., teleconferencing) in an IP environment.

To be SGM capable a host and/or MS keeps track of destinations that it wants to send packets to, and create packet headers that contain the list of destination addresses. We refer to these headers as SGM headers, hereafter. Each router must be able to parse the SGM header, partition destinations based on each destinations next hop, and forward an appropriate SGM packet to the next hops.

As an MS moves within a wireless network, it will move into new radio cells serviced by a BS for which it must establish contact. When an MS detects a new pilot signal from the new BS, it determines whether the signal strength of the pilot signal is sufficient to sustain communication, and then the MS itself signals this new BS to commence communication with it. This differs from prior art CDMA implementations because in the prior an the MS contacts its current BS and the BSC acts as the intermediary between the MS and the new BS. In our inventive network, a MS receives confirmation from the new BS/ERC (BS/Edge Router Controller) directly, and updates its list of active BSs accordingly. As the MS commences communication with a new BS/ERC, it obtains a new IP address in the new subnet as well as keeps (or extends the lease of) its old IP address in an IPv6 environment, an MS may use either Dynamic Host Configuration Protocol (DHCP) or a Forward Address Assignment scheme for obtaining the new addresses. In our IP-centric CDMA environment joining a new cell is the same as joining a new subnet. Typically, the CDMA transceiver employs a rake receiver, where each of the fingers of the rake receiver has an IP address as if it were a separate MS.

A CDMA Rake receiver may also have a Session Initiation Protocol (SIP) Uniform Resource Locator (URL) as well. For instance, if the Rake receiver of an MS has 3 fingers, they may be referred to as Y1="user@host1", Y2="user@host2", and Y3="user@host3". This paradigm requires that a SIP user agent be able to support multiple URLs as well as IP addresses.

Once a MS establishes its IP address and multicasting session with the select set of BSs, it periodically sends a "request message" to all BSs in its active list, and requests them to inform the MS about the strength of signals on its reverse links. The MS transmits its outbound packets to the BS whose reverse path signal strength is the strongest. Whenever an MS decides to remove a BS from its active list, it releases the corresponding IP address, if necessary.

In our invention, the radio signals are not mixed at the physical layer (i.e., the radio signal mixer of a typical CDMA receiver is disabled). The multiple packet flows received by each IP address resident in the Mobile station are forwarded to the IP layer where they will be mixed (at IP++layer) to synthesize a single IP packet flow for higher layers. In order to effect this mixing capability, each MS and host in our IP-centric CDMA network, must time stamp each IP packet before forwarding it to the network to ensure strict synchronization at the receiving MSs. This time stamp serves as a sequence number within each flow (one may use RTP to provide this time-stamp for real-time applications or place the stamp in an extension header of IPv6), and may also be used for forward error correction to protect against errors on the wireless media. An end-to-end delay equalization method [see J. Escobar, C. Partirdge, and D. Deutsch. "Flow Synchronization Protocol", IEEE/ACM Trans. On Networking, Vol.2 No. 4, April 1994] is used for content synchronization.

Each packet is forwarded to the higher layer mixer at time (Ts+T), where Ts is the time stamp of the packet and T is an acceptable delay within the MS to compensate for the different delays multicasted packets may endure over the different paths they may take. This mixer is at the IP++ layer in the protocol stack. The mixer uses a simple majority rule to combine the contents of packets with identical time stamps. To illustrate, suppose there are N soft hand-off legs and therefore N packets are forwarded to MS. The mixer in the MS reads each bit of these N packets concurrently. If the number of legs is odd (ie. N is a n odd number), then the value of each bit in a packet is determined by majority rule As an example, if there are three legs of the transmission at a MS and the mixer was attempting to ascertain the value of the first bit in the packet, the mixer would look at the first bit in each packet and select as the value of the first bit, the value that appears at least two times. If the number of legs is even (i.e., N is an even number) then the mixer uses a weighted average based on the normalized signal strength of the received signal on each leg. Specifically, if $B_j(k)$, $1 \leq j \leq M$ where M is the packet size and $1 \leq k \leq N$, represents the value of the jth bit of a packet on the k-th packet stream and P(k) represents the signal strength of the $k_{th}$ leg, if $X = \Sigma_k P(k)B_j(k) > N/2$ the jth bit is set to 1. Otherwise, the jth bit is set to 0. Under the third circumstance when N is an even number and $X=N/2$, the mixer sets the value of the bit to the one received on the channel with the strongest pilot.

Figure 2:
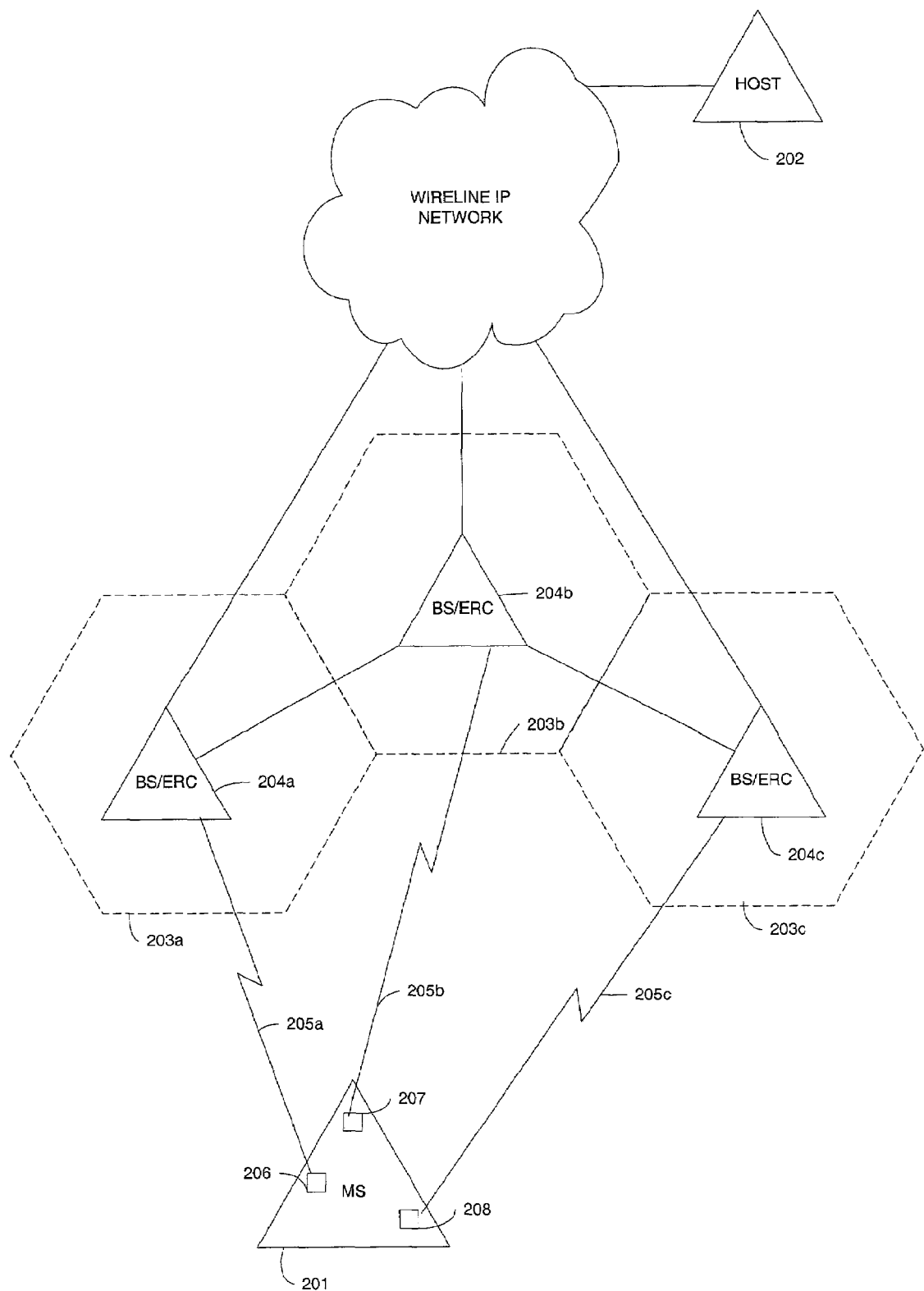
FIG. 2 illustrates the operation of soft hand-off in accordance with one embodiment of our invention.

The operation of our soft hand-off method is illustrated using the network depicted in FIG. 2. For the sake of discussion, suppose that an MS 201 and its corresponding host (CH) 202 are already engaged in an ongoing SIP session over links 205a and 205b in an established multicast session through BS/ERC- 204a and 204b respectfully where the members of the multicast session are the CH 202 and the MS IP address 206 and MS IP address 207. When the MS enters the intersection of cells 203b and 203c and it decides to initiate communication with BS/ERC-204c, on the forward link (i.e., the link from the BSs to the MSs), virtual soft hand-off operates as follows:

The MS 201 depicts the pilot 205c of BS/ERC 204c and assesses whether it is strong enough to establish communication. It then sends a request for communication to BS/ERC 204c. The BS/ERC 204c accepts the request and responds with the necessary radio parameters. The MS 201 requests for a new IP 208 address from DHCP process within the BS/ERC 204c in subnet 3 (i.e., cell 3) as well as extends the lease of its current IP address 207 in subnet 2 203b(note that the subnets are synonymous to individual Pico cells). The MS 201 sends a SIP REFER message with the new MS IP address of its link with the BS/RC 202c in its Contact field to the CH user agent indicating that MS 201 wants CH 202 to invite this new IP address 208 to the session. In this scenario, the MS 201 IP address 207, the CH 202, and the MS IP address 208 on its link to BS/ERC 204c play the roles of "Transferor", "Transferee", and the "Transfer Target", respectively. Note that this REFER request has no impact on the current on going session between the MS 201 and the CH 202 from IP address 206 and IP address 207 and leaves them intact. The CH invites IP address 208 to the session by sending a SIP INVITE message. After the receipt of 200 OK from MS's IP address 207, the CH 202 sends the ACK to IP address 208, and IP address 208 becomes part of the multicast session. Next, the CH 202 SIPO user agent sends a NOTIFY message to the IP address 207 to inform it about the result of its REFER request, The IP address of 208 is added to the SGM destination list at the CH 202. The multicast session is established and the data transfer continues on it. The CH 202 sends time-stamped packets with SGM headers to IP address 206, 207, and 208. The MS 201 receives the multiple identical packets and forwards the multiple packet flows to the IP layer so that it synthesizes a single packet flow for a higher layer in accordance with our inventive process described above. When a BS/REC is removed from the active list and replaced with a new one, the associated finger gets a new IP address in the new subnet. Then, MS 201 sends a REFER message to the CH 202 indicating that the CH should invite the new finger at its new address to join the session. The CH should also update its list of SGM destinations accordingly.

On the reverse link, the MS measures the signal strength of all BS/ERCs on the reverse link, and transmits packets to the one that has best signal quality. Of course, the source address in the outbound IP packets will be the same as that of the finger that transmits on the selected reverse link.

Figure 3:
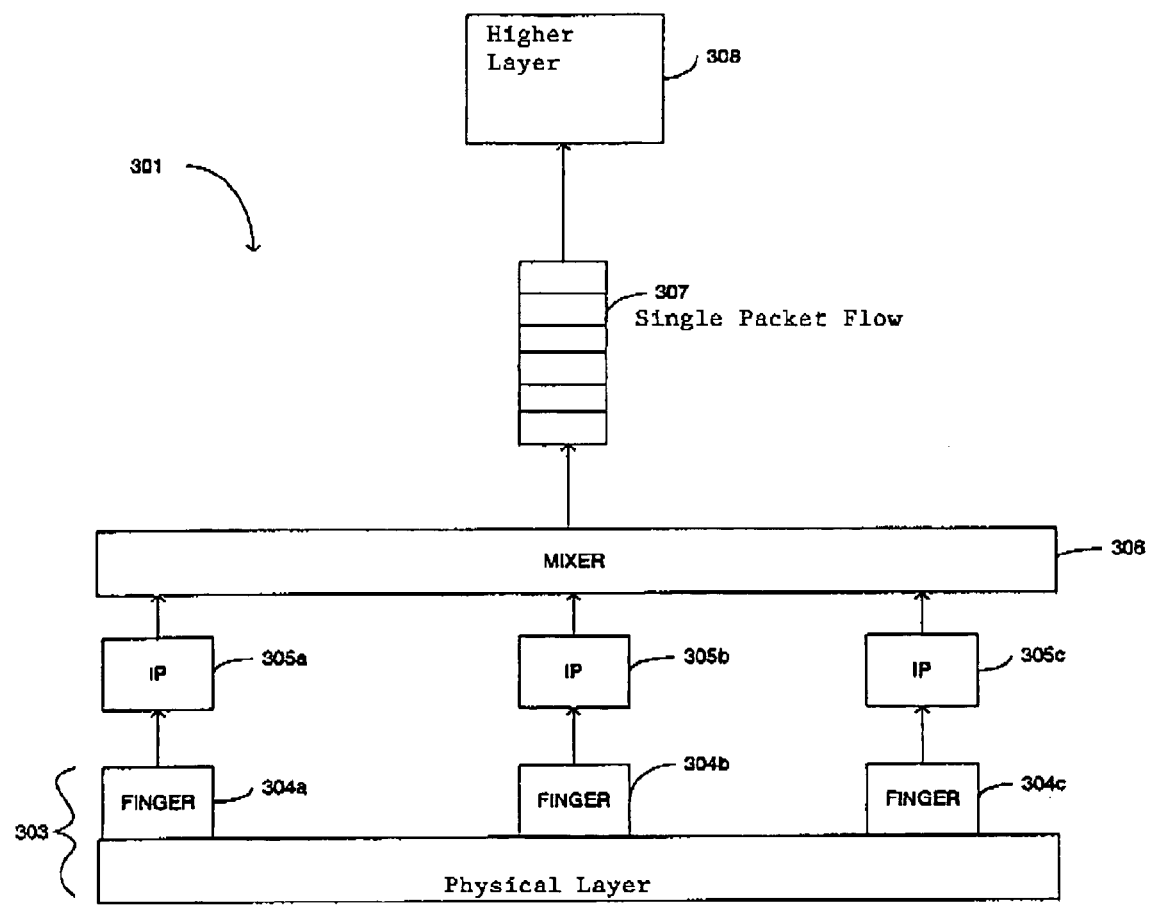
FIG. 3 illustrates a schematic diagram of a CDMA with a soft hand-off capability in accordance with our invention.

FIG. 3 depicts a schematic of a CDMA receiver in accordance with our invention. Specifically the receiver 301 is a means for receiving the radio signals at the physical layer 303. Each finger (304a, b, and c) can be considered a separate physical receiver. Each finger (304a 304b, and 304c) receives a signal from a different base station. The fingers forward their received signals to a corresponding function at the IP layer (305a, 305b, and 305c). Each corresponding IP layer for each finger sends its received packet flows to the mixer 306 which combines the received packet flows in accordance with the method described above into a single packet flow 307 for forwarding to the higher layers 308.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

GLOSSARY OF ACRONYMS

ACK—Acknowledgement
BGP—Border gate Protocol
BS—Base Station
BSC—Base Station Controller
BS/ERC—BS/Edge Router Controller
CDMA—Code Division Multiple Access
CH—Corresponding Host
DHCP—Dynamic Host Configuration Protocol
IP—Internet protocol
LAN—Local Area Network
MS—Mobile Station
OSPF—Open Shortest Path First
QoS—Quality of Service
RAN—Radio Access Network
REFER—It is the SIO request message containing the REFER method as defined by RFC3261. The REFER method indicates that the recipient (identified by the Request-URI) should contact a third party using the contact information provided in the request, e.g., should transfer the call to the third party whose address or URL is in the contact information.
RTP—Real Time Transport Protocol
SGM—Small Group Multicasting
SIP—Session Initiation Protocol

What is claimed is:

1. A method for conducting a hand-off in a wireless network having a mobile station and a plurality of base stations each of which acts as an internet protocol router and said mobile station being in communication with a subset of said plurality of base stations, said method comprising the steps of:
    said mobile station obtaining an IP address from a new base station not a member of said subset of plurality of base stations;
    establishing a multicast communication session between said mobile station, said subset of base stations, and said new base station using said IP address;
    a CDMA receiver at said mobile station receiving a plurality of signals containing packets from said multicast communication session at a physical layer of a protocol stack;
    said mobile station mixing said plurality of signals at a higher layer in the protocol stack, said mixing step comprising;
    extracting from said signals packets of data received from each base station in said multicast communication session;
    forwarding said packets to the IP layer of the protocol stack in said mobile station; and
    synthesizing a single IP packet from said forwarded packets, said synthesizing step comprising using a weighted average of the signal strength and the bit value of said packets to determine the bit value of the synthesized single IP packet.

2. The method of claim 1 wherein said multicast session utilizes Small Group Multicasting.

3. The method of claim 1 wherein the data packets of said plurality of signals are each time stamped.

4. The method of claim 3 wherein said mixing step further comprises synchronizing each packet of the received signals to its companion packets of said plurality of signals.

* * * * *

UNITED STATES PATENT AND TRADEMARK OFFICE
CERTIFICATE OF CORRECTION

| | |
|---|---|
| PATENT NO. | : 7,072,317 B2 |
| APPLICATION NO. | : 10/103919 |
| DATED | : July 4, 2006 |
| INVENTOR(S) | : Vakil et al. |

It is certified that error appears in the above-identified patent and that said Letters Patent is hereby corrected as shown below:

In the Specification

In Column 5, Line 18, delete "prior an" and insert -- prior art --, therefor.

In Column 5, Lines 25-26, delete "address in" and insert -- address. In --, therefor.

In Column 5, Line 31, delete "fingers of" and insert -- fingers in --, therefor.

In Column 5, Line 64, delete "Partirdge," and insert -- Partridges, --, therefor.

In Column 6, Line 2, delete "stamp of the packet" and insert -- stamp within the packet, --, therefor.

In Column 6, Line 3, delete "acceptable delay" and insert -- acceptable buffering delay --, therefor.

In Column 6, Line 11, delete "(ie. N is a n" and insert -- (i.e. N is an --, therefor.

In Column 6, Line 12, delete "rule" and insert -- rule. --, therefor.

In Column 6, Line 20, delete "received signal" and insert -- received radio signal --, therefor.

In Column 6, Line 21, delete "size" and insert -- size, --, therefor.

In Column 6, Line 23, delete "$k_{th}$" and insert -- $k^{th}$ --, therefor.

In Column 6, Line 40, delete "depicts" and insert -- detects --, therefor.

In Column 6, Line 50, delete "BS/RC 202c" and insert -- BS/ERC 204c --, therefor.

In Column 6, Line 54, delete "BS/ERC 204c" and insert -- BS/ERC 204c, --, therefor.

Signed and Sealed this
Eighteenth Day of November, 2014

Michelle K. Lee
*Deputy Director of the United States Patent and Trademark Office*

CERTIFICATE OF CORRECTION (continued)
U.S. Pat. No. 7,072,317 B2

In Column 6, Line 55, delete "of "Transferor", "Transferee"," and insert -- of the "Transferor", the "Transferee", --, therefor.

In Column 6, Line 58, delete "address 207" and insert -- address 207, --, therefor.

In Column 6, Line 63, delete "SIPO" and insert -- SIP --, therefor.

In Column 6, Line 65, delete "request," and insert -- request. --, therefor.

In Column 7, Line 3, delete "packets" and insert -- packets, --, therefor.

In Column 7, Line 6, delete "BS/REC" and insert -- BS/ERC --, therefor.

In Column 7, Line 18, delete "schematic of" and insert -- schematic diagram of --, therefor.

In Column 7, Line 19, delete "Specifically" and insert -- Specifically, --, therefor.

In Column 7, Line 22, delete "(304a" and insert -- (304a, --, therefor.

In the Claims

In Column 8, Line 34, in Claim 1, delete "comprising;" and insert -- comprising: --, therefor.